United States Patent
Lazier et al.

(10) Patent No.: US 8,255,873 B2
(45) Date of Patent: Aug. 28, 2012

(54) HANDLING EXTERNAL CONTENT IN WEB APPLICATIONS

(75) Inventors: Ari Lazier, Seattle, WA (US); Hugh Williams, Redmond, WA (US); Nick Whyte, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 1272 days.

(21) Appl. No.: 11/561,464

(22) Filed: Nov. 20, 2006

(65) Prior Publication Data

US 2008/0120533 A1    May 22, 2008

(51) Int. Cl.
 G06F 9/44 (2006.01)
 G06F 11/00 (2006.01)

(52) U.S. Cl. .......................... 717/124; 714/38.1

(58) Field of Classification Search ............... None
See application file for complete search history.

(56) References Cited

U.S. PATENT DOCUMENTS

| | | | |
|---|---|---|---|
| 5,745,360 A | 4/1998 | Leone et al. | |
| 6,138,157 A | 10/2000 | Welter et al. | |
| 6,253,204 B1 | 6/2001 | Glass et al. | |
| 6,549,944 B1 | 4/2003 | Weinberg et al. | |
| 6,601,066 B1 * | 7/2003 | Davis-Hall ........................... 1/1 | |
| 6,615,259 B1 * | 9/2003 | Nguyen et al. ............... 709/224 | |
| 6,810,494 B2 * | 10/2004 | Weinberg et al. ............... 714/46 | |
| 6,823,379 B1 | 11/2004 | Heckel et al. | |
| 6,854,074 B2 | 2/2005 | McLellan et al. | |
| 7,216,256 B2 * | 5/2007 | Sankaran et al. ............... 714/27 | |
| 7,231,606 B2 * | 6/2007 | Miller et al. .................. 715/738 |
| 7,363,364 B2 * | 4/2008 | Sankaran et al. ............. 709/223 |
| 7,401,287 B2 * | 7/2008 | Suzuki .......................... 715/208 |
| 7,426,556 B2 * | 9/2008 | Sankaran et al. ............. 709/223 |
| 7,461,297 B2 * | 12/2008 | McLellan et al. ............... 714/39 |
| 7,484,178 B2 * | 1/2009 | Sholl ............................. 715/760 |
| 7,519,679 B2 * | 4/2009 | Kale et al. ..................... 709/217 |
| 7,539,740 B2 * | 5/2009 | Hasunuma .................... 709/223 |
| 7,624,173 B2 * | 11/2009 | Bary et al. ..................... 709/224 |
| 7,689,667 B2 * | 3/2010 | Lal ................................. 709/218 |
| 7,725,452 B1 * | 5/2010 | Randall ......................... 707/709 |
| 7,757,175 B2 * | 7/2010 | Miller ........................... 715/738 |
| 2002/0087915 A1 | 7/2002 | Perla et al. |
| 2002/0099818 A1 * | 7/2002 | Russell et al. ................ 709/224 |

(Continued)

OTHER PUBLICATIONS

Rydstedt et al. "Busting Frame Busting: a Study of Clickjacking Vulnerabilities on Popular Sites" Jun. 7, 2010, retried from <http://w2spconf.com/2010/papers/p27.pdf>, total pages 13.*

(Continued)

*Primary Examiner* — Don Wong
*Assistant Examiner* — Marina Lee
(74) *Attorney, Agent, or Firm* — Shook Hardy & Bacon LLP

(57) ABSTRACT

A media and method for detecting third-party content in web pages is provided. Computer software operates on a server or a client-side computer to identify and analyze third-party links and contents in web pages to determine if a third-party content sill exists, is available, has changed, or disrupts a web browser. A third-party link or content can be removed, changed, or replaced. A user can be notified or given an option to handle changed third-party content. The server may remove the third-party link or content by changing an HTML file for the web page. The client-side computer may remove the third-party link or content by dynamically changing the rendered web page before it is displayed to the user.

18 Claims, 6 Drawing Sheets

U.S. PATENT DOCUMENTS

| | | | | |
|---|---|---|---|---|
| 2002/0103856 | A1* | 8/2002 | Hewett et al. | 709/203 |
| 2002/0120727 | A1* | 8/2002 | Curley et al. | 709/223 |
| 2002/0143813 | A1* | 10/2002 | Jellum et al. | 707/511 |
| 2003/0182417 | A1* | 9/2003 | Hasunuma | 709/223 |
| 2004/0158429 | A1* | 8/2004 | Bary et al. | 702/183 |
| 2005/0015512 | A1* | 1/2005 | Kale et al. | 709/245 |
| 2005/0076265 | A1 | 4/2005 | Hsu et al. | |
| 2005/0257098 | A1 | 11/2005 | Andrews et al. | |
| 2005/0289454 | A1 | 12/2005 | Donelson et al. | |
| 2006/0005086 | A1* | 1/2006 | Stephenson et al. | 714/47 |
| 2006/0015573 | A1* | 1/2006 | Hurst-Hiller et al. | 709/218 |
| 2006/0031404 | A1* | 2/2006 | Kassab | 709/218 |
| 2006/0047805 | A1* | 3/2006 | Byrd et al. | 709/224 |
| 2006/0112178 | A1* | 5/2006 | Van Vleet et al. | 709/224 |
| 2006/0224593 | A1* | 10/2006 | Benton et al. | 707/10 |
| 2007/0174324 | A1* | 7/2007 | Palapudi et al. | 707/102 |
| 2007/0180147 | A1* | 8/2007 | Leigh | 709/246 |
| 2008/0120533 | A1* | 5/2008 | Lazier et al. | 715/234 |

OTHER PUBLICATIONS

Wen-Kui Chang, Shing-Kai Hon and Cheng-Chung William Chu, "A Systematic Framework for Evaluating Hyperlink Validity in Web Environments", Dept. of Computer Science & Information Engineering, Tunghai University, Taiwan, E-mail: wkc@mail.thu.edu.tw, 2003.

Rick Bodner, Mark Chignell, and Jim Tam, "Website Authoring using Dynamic Hypertext", Mechanical and Industrial Engineering, 4 Taddle Creek Road, University of Toronto, Toronto, Ontario, M5S 1A4, Canada, E-mail: [rodner, chignel, tam]@ie.utoronto.ca, 1997.

Mary Fernandez, Daniela Florescu, Alon Levy and Dan Suciu, "Web-Site Management: The Strudel Approach", AT&T Labs, mff@research.att.com, INRIA Roquencourt, dana@rodin.inria.fr, Univ. of Washington, alon@cs.washington.edu, AT&T Labs, suciu@research.att.com, 1998.

Daniela Florescu, Alon Levy, Dan Suciu and Khaled Yagoub, "Optimization of Run-time Management of Data Intensive Web Sites", INRIA Rocquencourt, France, Daniela.Florescu@inria.fr, University of Washington, Seattle, alon@cs.washington.edu, AT&T Labs—Research, suciu@research.att.com, PRISM Versailles, France, khaled. yagoub@prism.uvsq.fr, Edinburgh, Scotland, 1999.

* cited by examiner

HANDLING EXTERNAL CONTENT IN WEB APPLICATIONS

CROSS-REFERENCE TO RELATED APPLICATIONS

Not applicable

STATEMENT REGARDING FEDERALLY SPONSORED RESEARCH OR DEVELOPMENT

Not applicable.

BACKGROUND

Web sites commonly include content from external sources. Most commonly, an HTML file for a website may contain hyperlinks that correspond to contents provided by a third party. Content that is included from external sources can cause a number of problems since the publisher of the host website does not have control over the external content. For example, the external content may no longer exist, may be temporarily unavailable, may have changed over time, or may contain computer software such as scripts that disrupts the host application.

In one scenario, embedded web pages attempt to disrupt a host application by frame breaking or through other scripting techniques. A web publisher that controls or owns a website does not have control over the content in the embedded web pages. As such, these embedded web pages may perform frame breaking to the unsuspecting web publisher by hijacking the host application. The frame breaking may cause the host application to terminate or redirect to another web page unintended by the user.

In a second scenario, third-party content that was previously discovered and placed in the publisher's website either directly or through a hyperlink may now be inaccessible, unavailable, or different from the previous version. Typically, the host application cannot render inaccessible or unavailable third-party content, but can render different third-party content. The second scenario is indicative of a changed URL or a changed third-party content of a URL.

SUMMARY

The Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The disclosure describes, among other things, media and a method for handling third-party content in web applications. The various solutions are summarized below.

Embodiments of the present invention cover detecting third-party content in web applications and resolving problems associated with third-party content. Media and a method are provided to predict problems before their consequences propagate to a user. The problems are detected through an analysis of third-party content either before the user requests the content or dynamically in the user's web browser before the content is displayed.

Computer-readable media operates computer software on a server or a client-side computer to detect third-party links and contents in a web page. The detected link or content is analyzed to determine if the content still exists, is available, has changed, or disrupts a host application. If the content still exists, is available, has changed, or disrupts a host application, the web page is modified to remove or change the detected link or detected content. A user may receive a notification about the third-party content or receive an option to display other content.

BRIEF DESCRIPTION OF THE SEVERAL VIEWS OF THE DRAWINGS

The present invention is described in detail below with reference to the attached drawing figures, which are incorporated herein by reference, and wherein.

DETAILED DESCRIPTION

The present invention will be better understood from the detailed description provided below and from the accompanying drawings of various embodiments of the invention, which describe, for example, media and a method for handling third-party content in web applications. The detailed description and drawings, however, should not be read to limit the invention to the specific embodiments. Rather, these specifics are provided for explanatory purposes that help the invention to be better understood.

Exemplary Operating Environment

Figure 1:
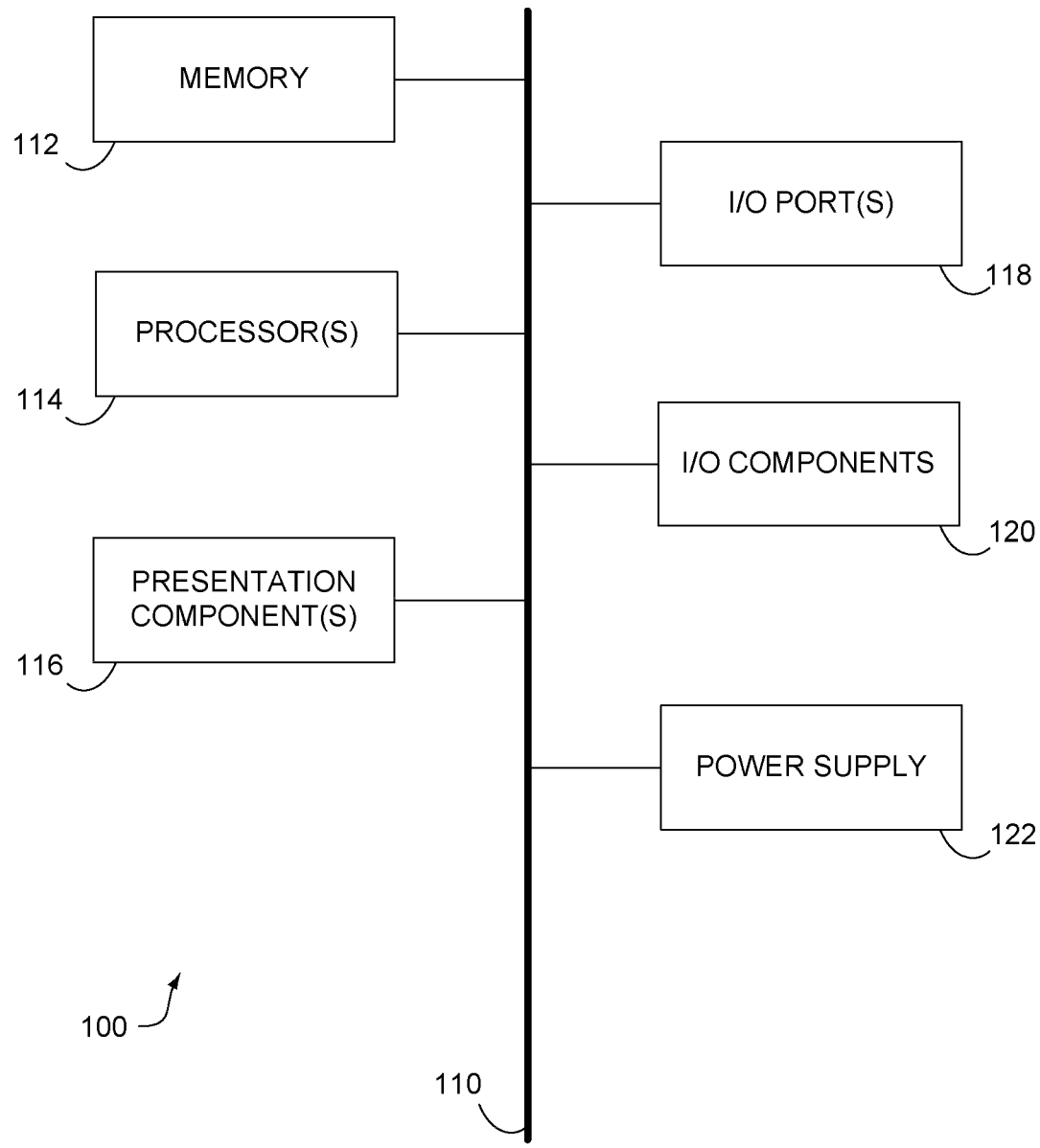
FIG. 1 is an exemplary operating environment suitable for practicing an embodiment of the present invention.

Referring to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should the computing-environment 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. The invention may be practiced in a variety of system configurations, including hand-held devices, consumer electronics, general-purpose computers, more specialty computing devices, etc.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Many different arrangements of the various components depicted, as well as components not shown, are possible without departing from the spirit and scope of the present invention. Embodiments of the present invention will be described with the intent to be illustrative rather than restrictive. Alternative embodiments will become apparent to those skilled in the art that do not depart from its scope. A skilled artisan may develop alternative means of implementing improvements without departing from the scope of the present invention.

To help explain the invention without obscuring its functionality, an embodiment will now be referenced. Although the present invention can be employed in connection with a computing-network environment, it should not be construed as limited to the exemplary applications provided here for illustrative purposes.

Third-Party Content Detection and Resolution

Embodiments of the present invention may be explained in two phases, an analysis of third-party content and dynamically changing a host interface in response to an output of the analysis. The analysis is performed on the content before it is rendered and made visible to a user. For example, if a web page contains scripts that will disrupt a host application such as a web browser or an application running in the web browser, then the scripts are detected before they are executed.

Throughout this document, a reference to the phrase "third-party content" may be replaced with a reference to the term "content." Either use of the phrase "third-party content" or term "content" will have the same meaning of referring to content provided by someone or an entity other than the owner, controller, or publisher of the web page. Any other use of the term "content" will be accompanied about an appropriate modifier.

In a scenario, computer software detects if the content will disrupt the host application before the content is rendered. The analysis can be performed either at a time prior to a request for the content by the user or during the request for the content by the user. The analysis is performed on a server when the time is prior to the request for the content and performed on a client-side computing device when the time is during the request for the content. During the request, the analysis is performed in the host application (or web browser) which runs on the user's computer. In either case, the content is downloaded, either on the server or on the user's computer, without rendering it. A classifier is used to detect one of several consequences of loading the content. The classifier can determine if the content is no longer available, if the content is unavailable or inaccessible, if the content has changed, or if the content contains harmful code. Further details about the detection and the analysis may be shown below in the figures.

Figure 2:
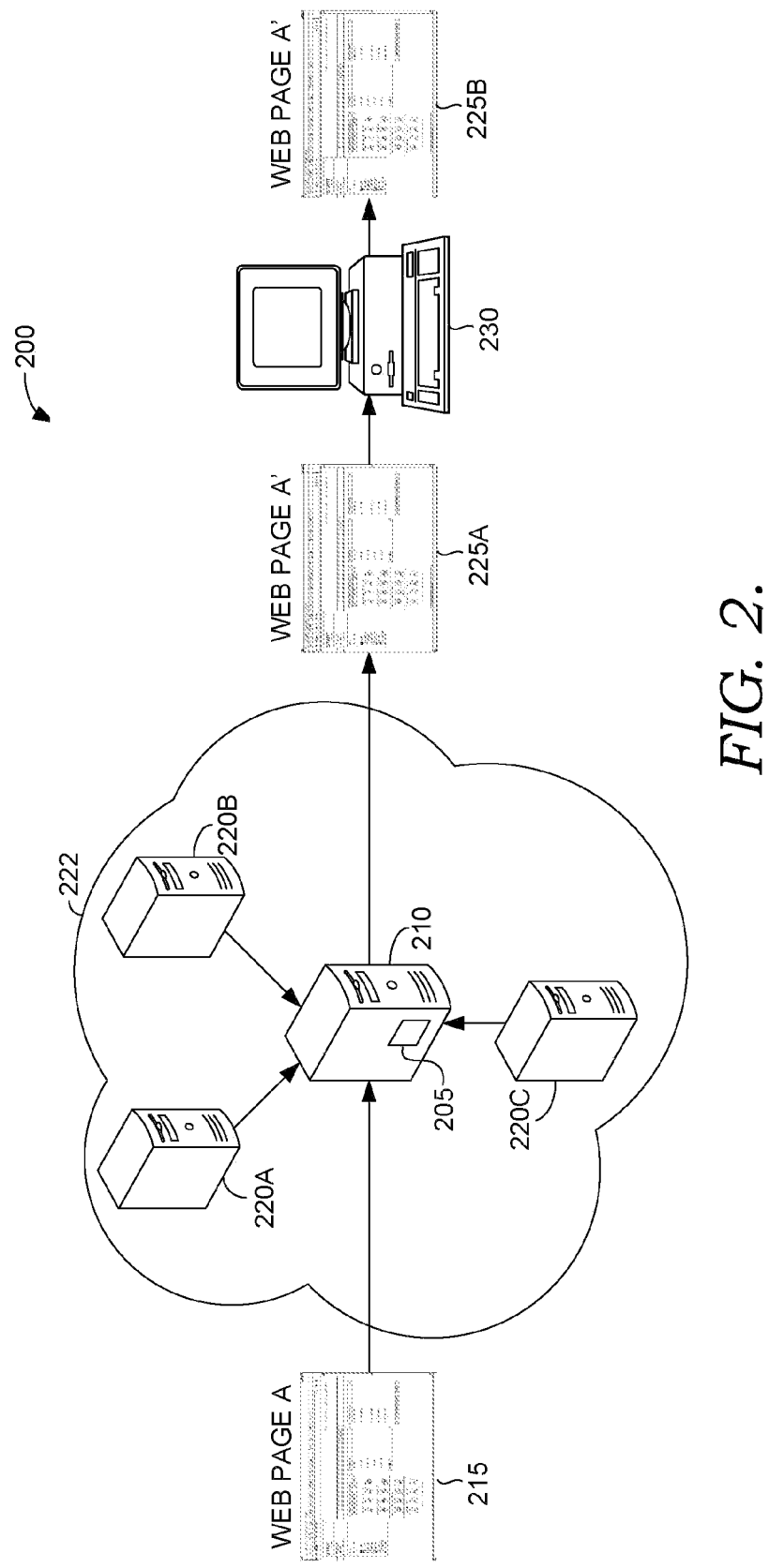
FIG. 2 is an exemplary operating environment with an exemplary software operating on a server to detect and analyze third-party content when practicing an embodiment of the present invention.

In FIG. 2, an operating environment 200 is shown with a software 205 operating on a web server 210. Web server 210 is connected to other servers 220A-220C in the Internet 222. In FIG. 2, a web page A 215 may be created as an HTML file and stored in web server 210. In the HTML file, embedded hyperlinks may exist that link to content owned or controlled by a third-party identified in FIG. 2 as servers 220A-220C. For example, the content may be another web page, an image, a video, an audio, a document, a flash application, a data in an RSS feed, an, XML content, and a Javascript application that is rendered when web page A 215 is executed and loaded at the user's computer. However, before web page A 215 is provided to the user's computer, software 205 operates to search web page A 215 and all embedded links contained therein. Software 205 searches for contents associated with the embedded links and determines if the contents and the links belong to a third-party. If a content or a link belongs to a third-party, that link or content is downloaded to a storage device. The storage device is not shown in FIG. 2 but may be a storage device connected to or integrated with web server 210, or the storage device may be connected to another computing device.

Software 205 analyzes the link or the content to determine if the link or content still exists. The link or the content may no longer exist from an earlier timeframe when the link was placed in the HTML file of the web page. The content may be temporarily unavailable or inaccessible. For example, the server which contains the content may be down preventing access to the content although the link and the content are good. The link or the content may have changed from an earlier timeframe when the link was placed in the HTML file of the web page. For example, an analysis of the link or the content over successive periodic intervals may reveal a change in the link or a change in the content from a previous analysis. The content may contain software that is harmful to the rendering device such as the web browser.

If the analyses by software 205 reveal the problems above, software 205 resolves the problems in several ways. The link or the content may be removed from the web page. The link or the content may be changed to a similar link or content as a form of substitution. A notice may be provided to the user at the display of the user's computer. For example, a message may be displayed that states "the web publisher cannot account for the veracity of third party content and the third-party content may be harmful to the user's computer." The user may also receive a notification warning that some of the information contained in the web site may have changed. The user can further receive a message providing the user with several selectable options. A message can be received asking the user to select if the user wants to continue with a rendering of the content, if the user wants to change to a rendering of another or substitute content, or if the user want to prohibit a rendering of the content at all.

Software 205 implements one of the several modifications discussed above to give rise to web page A' 225A which represents a modified version of web page A 215. When the user at computer 230 attempts to access a web page from web server 210, web page A' 225A is provided to the display of computer 230 and shown to the user as web page A' 225B. Web page A' 225A and web page A' 225 B are similar with the difference being the logical position of the web page before it enters computer 230 and the logical position of the web page after it is displayed. Although computer 230 is referenced as the device that receives web page A' 225A, more clearly, the host application such as the user's web browser will receive web page A' 225A and render it to the display as web page A' 225B.

A discussion of FIG. 2 may be detailed further as follows. When the analysis is performed at the time prior to the request for the content by the user, the content can be marked with an output of the classifier. As stated above, the classifier can detect the consequences of loading the content. The output of the classifier can be used for processing the content, such as deciding what content to present to the user. The classifier looks for patterns of software that can cause a disruption to the host application. An example of this pattern is software that causes frame breaking.

For frame breaking, it is known that when a user sets the "top.location" variable in JAVASCRIPT, a scripting language trademarked by Sun Microsystems of Palo Alto, Calif., the user can break out of the frame which results in a termination of the host application. In addition to this frame breaking technique, there are other ways to perform a frame break, and by detecting the content's use of one of these techniques, a determination can be made if the content is safe to render.

Methods to detect frame breaking and other disruptive scripts include searching for the software that breaks out of frames or performs other actions, searching for common function names that may be used on multiple websites, searching for file names or words in function names, or searching for common software patterns that suggest a presence of disruptive scripting.

Figure 3:
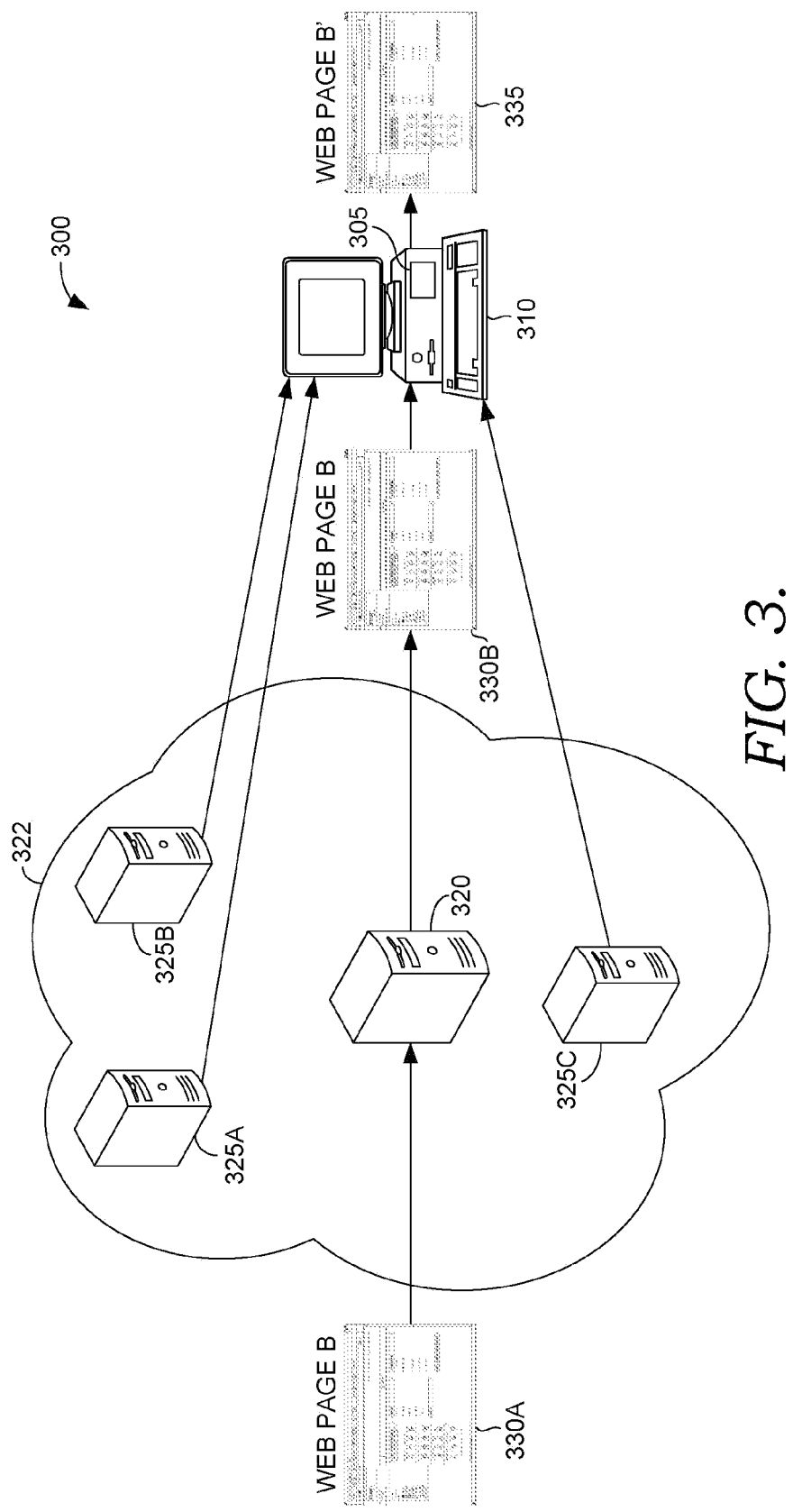
FIG. 3 is an exemplary operating environment with an exemplary software operating on a client-side computing device to detect and analyze third-party content when practicing an embodiment of the present invention.

Turning now to FIG. 3, an operating environment 300 is shown with a software 305 operating on a computer 310. Computer 310 communicates with web server 320 and servers 325A-325C which are located in the Internet 322. Web server 320 holds a web page B 330A which can be delivered to computer 310 as web page B 330B when accessed by the user at computer 310. In other words, when the user at computer 310 accesses the Internet 322 and wants to access web page B 330A that is stored on web server 320, the user makes a communication connection to web server 320 and retrieves web page B 330A as web page B 330B. This is correct since in many cases, the user retrieves a copy of the web page and not the actual web page itself. However, for illustrations here, web page B 330A and web page B 330B are shown to illustrate that no modifications to the web page occurs at web server 320.

As the user retrieves web page B 330B at computer 310, software 305 detects and analyzes web page B 330B for the problems described above for third-party content. Software 305 may perform the same functions as software 205 discussed in FIG. 2. However, software 205 can dynamically remove, modify, or replace either the link or the content from the third-party in real time before the third-party content is displayed at computer 310. This is one difference between software 205 and software 305. Whereas software 205 may operate on an HTML file stored on server 210 without any time constraints to detect, analyze, and resolve third-party content issues, software 305 has to perform a similar task on a file that has to be rendered fairly quickly in order to immediately provide a display of the web page to the user. The end result of what may be eventually shown to the user is identified by web page B' 335 which represents a modified version of web page B 330B. The transformations that occur between web page A 215 and web page A' 225A with software 205 may also occur between web page B 330B and web page B' 335 with software 305. Of course, there are some differences that occur as has been discussed and will be discussed further.

When the analysis is performed on a client side such as computer 310, the output of the analysis can be used to dynamically change a user interface in response to the findings. For example, if one desires to display a third-party web page within a frame in the web browser and software 305 detects that the web page contains a script that will break out of the frame to take over the browser, software 305 can provide a notification to the user and provide the user with an option of displaying the content in another window or not displaying the content at all.

Another example of the frame breaking issue is identified by the software from WIKIPEDIA from the Wikimedia Foundation. "Wiki" software uses code for frame breaking in several web sites. The software code resides in a file with the same or similar name in the web sites. Therefore, from a detection standpoint, if a web page is configured to load this known file then an assumption can be made that the web page is a "frame buster." When such a web page is encountered, a decision can be made as part of the implementation of an embodiment of the present invention not to load the web page in the current frame, but load the web page in another frame to prevent termination of the host application. This solution can be applied during the search stage with software 205 on the server side (web server 210) or with software 305 on the client side (computer 310).

Continuing with FIG. 3, a scenario may be described about an embodiment. When software 305 is operating, the user requests a web page from computer 310. Third-party content can be asynchronously downloaded and fed into the classifier before the web page is loaded. The classifier is considered part of software 305. By using the correct HTTP headers, content can be cached so that the web page does not have to be re-downloaded after the classifier is complete and the outputs are provided. In addition, because some of the same commands are used that normally are used in loading the web page, software 305 can detect whether the third-party content or link is unavailable or inaccessible by verifying the status code and the content returned from the asynchronous request.

Based on the results, the user interface can then be dynamically generated in response to the output of the analysis involving the classifier.

Figure 4:
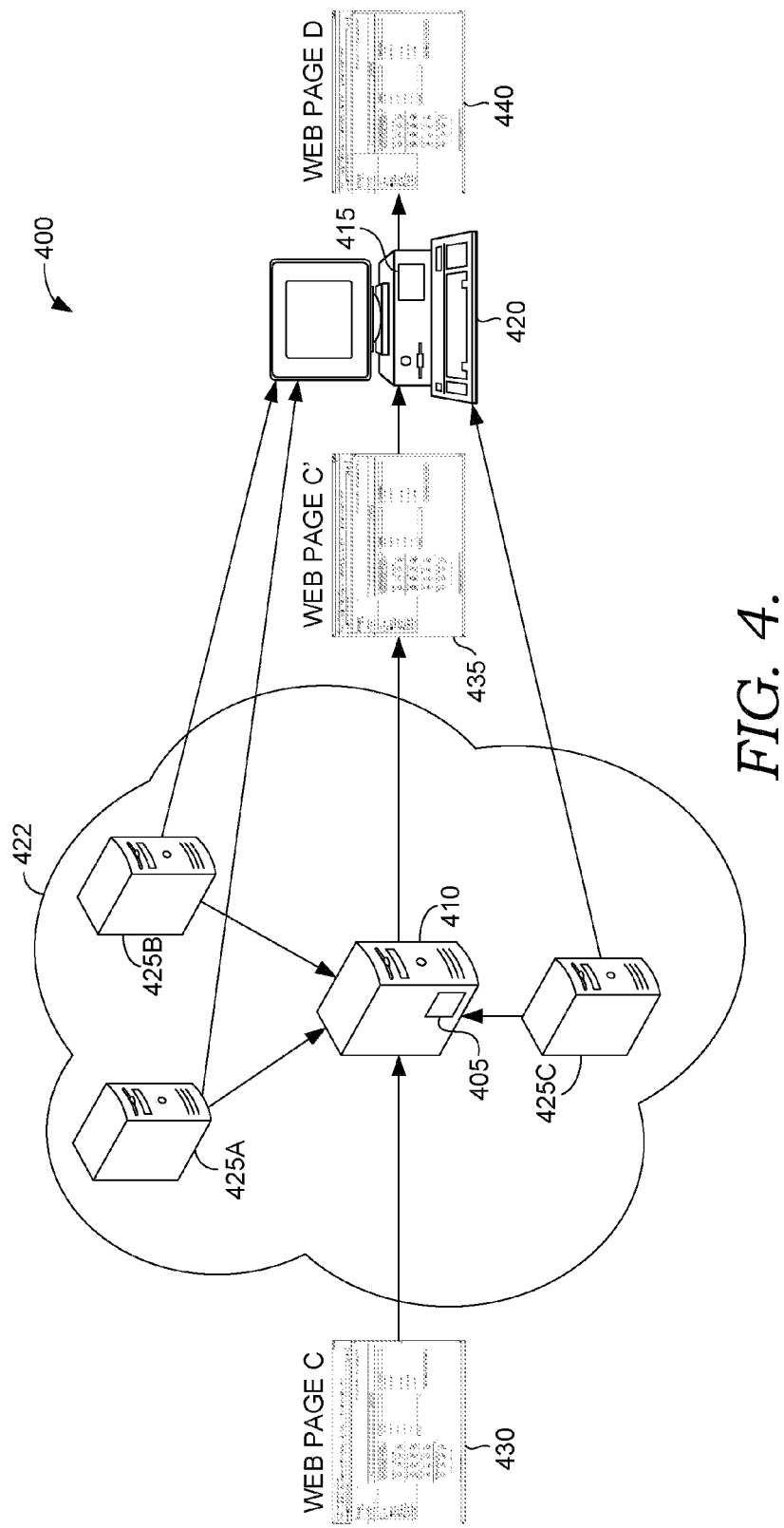
FIG. 4 is an exemplary operating environment with exemplary software operating on a server and a client-side computing device to detect and analyze third-party content when practicing an embodiment of the present invention.

In FIG. 4, an operating environment 400 is shown with a software 405 operating on a web server 410 and a software 415 operating on a computer 420. The discussion for FIGS. 2 and 3 are relevant to FIG. 4. Without going into further detail, an explanation of software 405 and software 415 may be found respective in software 205 and software 305. The functions are the same. FIG. 4 illustrates a scenario where a publisher implements an embodiment of the present invention and a user implements another embodiment of the present invention. FIG. 4 also illustrates a scenario when a third embodiment of the present invention is implemented including both a server and a client. The server is identified by web server 410 and the client is identified by computer 420.

In some situations, an embodiment of the present invention may be implemented where web server 410 operates software 405 on a periodic basis to detect and analyze third-party content in a web page C 430. The periodic interval can range from continuous to any intermittent timeframe such as days, weeks, months, etc. Software 405 can periodically check for changes to third-party content and resolve the problems before a user requests an associated web page at their computer. For example, an embodiment may be implemented with a web crawler that searches the entire Internet 422 for third-party content associated with web pages owned or maintained by a publisher. The web crawler can provide content to the classifier to create an identifier. The identifier from one interval can be compared to an identifier created in a next interval for each identified content. A mismatch of any two identifiers can cause software 405 to implement a solution to the associated web page. To reiterate, for cases where a current content is a changed version of an original content, identifiers such as file size, media properties, hash sums, samples, or snapshots, to name a few, may be used to determine if a content has changed or is no longer available or accessible.

The operation of software 405 may be influenced by external factors such as bandwidth and capacity availability. Since in many cases, storage space is needed to download third-party content before an analysis of the content can occur. If a publisher has a large storage capacity then the periodic interval may be shortened. Also, the periodic interval may be influenced by the processing capabilities of web server 410. In either case, software 405 can operate at intervals established by the publisher to check for third-party content in the web pages owned or maintained by the publisher.

As discussed above in FIGS. 2 and 3, the output of web page C 430 may be web page C' 435 if one of the consequences discussed above occurs with regards to third-party content. However, there may be situations where web page C' 435 is the same as web page C 430. This is indicative of no changes to the web page or HTML file. But a situation may occur where during a first interval, a change is made to third-party content resulting in web page C' 435, but another change occurs again to the same third-party content before software 405 executes again during the next interval. In between the interval, the user requests web page C' 435 at computer 420 and this time software 415 discovers a mismatch between an identifier created for the current third-party content from servers 425A-425C and a prior identifier created when third-party content was analyzed at the first interval and associated with web page C' 435. In this case, software 415 performs its own detection and analysis to update web page C' 435 to result in web page D 440. By operating software 405 and software 415 as separate embodiments or as a single embodiment, less computing resources are needed at either the server or the client. Consequently, web server 410 may alleviate a majority of the third-party content issues during its periodic operation leaving computer 420 to catch those third-party content issues that occur in between an interval or missed by software 405 at web server 410.

FIGS. 2-4 illustrate the various embodiments that may be implemented. As shown in FIG. 2, a server implementation may occur. In FIG. 3, a client implementation may occur. In FIG. 4 a server and client implementation may occur as separate embodiments or as a single embodiment. With regards to FIG. 4, separate embodiments may occur where a web service implements an embodiment similar to FIG. 2 but a user implements an embodiment similar to FIG. 3 without each implementer knowing about the others implementation. However, for example, an online service such as a video or music online store could implement a detection and analysis at its own servers but also provide through a subscription, downloadable software to implement detection and analysis at user computers. This configuration would represent the single embodiment as described in FIG. 4.

Figure 5:
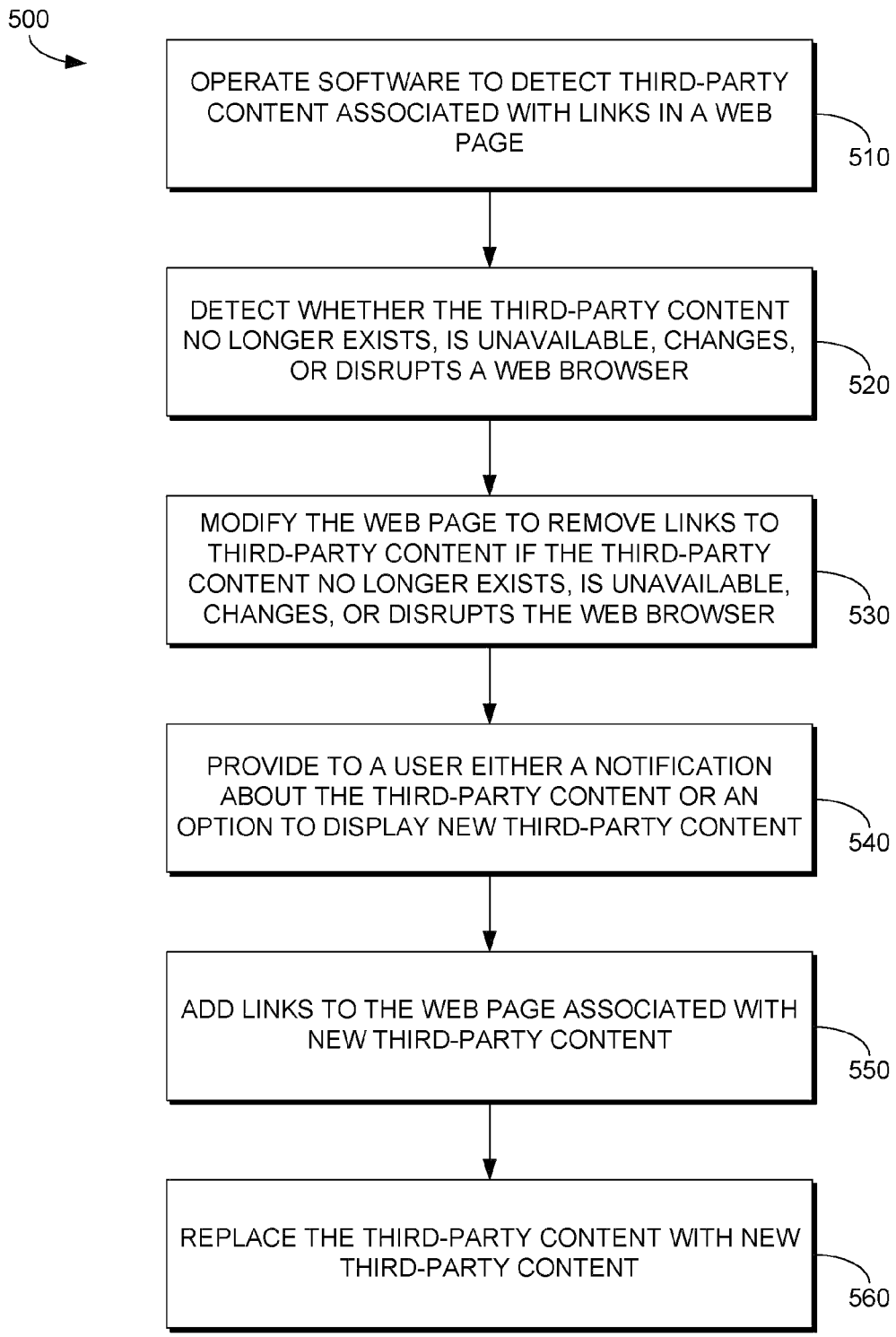
FIG. 5 is a flowchart of an exemplary process for handling third-party content in web applications when implementing an embodiment of the present invention.

Turning now to FIG. 5, a process for handling third-party content in web applications is shown in a method 500. In a step 510, software 205 or software 305 operates to detect third-party content associated with links in a web page. In a step 520, the classifier detects whether the third-party content exists, is available, has changed, or disrupts the web browser. In a step 530, software 205 or software 305 modifies the web page to remove links to third-party content if the third-party content no longer exists, is unavailable, changes, or disrupts the web browser. In a step 540, a user can receive at computer 310 or computer 420 a notification about the third-party content or receive an option to display new third-party content. In a step 550, links are added to the web page associated with new third-party content. In a step 560, third-party content is replaced with new third-party content in response to the output of the classifier in software 205 or software 305.

Figure 6:
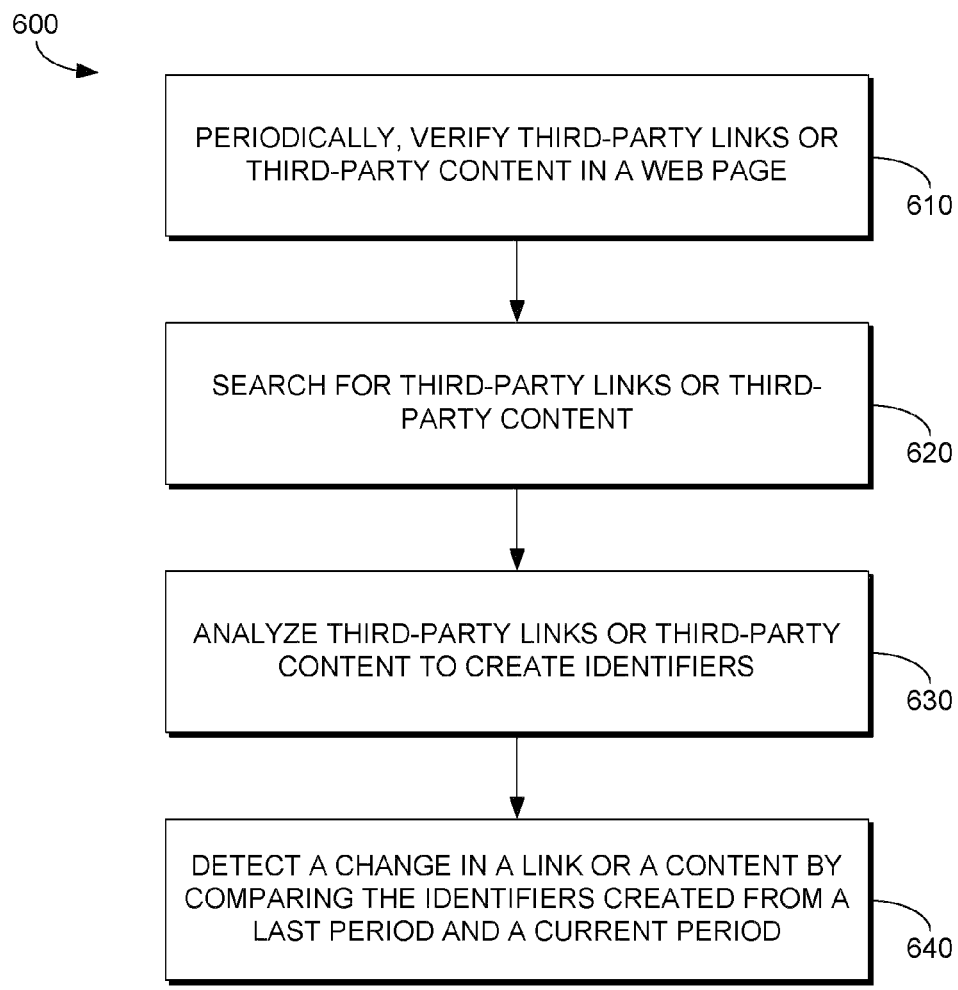
FIG. 6 is a flowchart of an exemplary process for detecting a validity of third-party content in web applications when implementing an embodiment of the present invention.

In FIG. 6, a process for detecting a validity of third-party content in web applications is shown in a method 600. Method 600 corresponds to FIG. 4 where an online service operates in the Internet 422. The online service can include a software program such as software 405 that periodically verifies third-party content embedded in the online service's web pages. For example, third-party content can include a variety of information such as advertising, images, audio, monitoring software, etc. When a user visits a website, they typically do not know what content in the web page belongs to the web site owner and what content belongs to a third party. As such, the online service operates a process like method 600 to remove potentially dangerous or problematic third-party content before it reaches the user.

In a step 610, software 405 periodically verifies third-party links or third-party content in all of its web pages. In a step 620, software 405 searches for third-party links or third-party content. This search can be performed with a search engine such as a web crawler. In a step 630, third-party links or third-party contents are analyzed to create identifiers such as file size, media properties, hash sums, samples, or snapshots. In a step 640, software 405 detects a change in a link or a content by comparing the identifiers created from a last period and a current period. If a difference is found between two identifiers for the same link or content, the link or content can be removed, changed, or substituted.

From FIGS. 2-6, an implementer can have a wide-range of flexibility to implement a number of embodiments to practice the present invention. The embodiments can detect frame busting web pages or detect unavailable or inaccessible content. As discussed in the figures, when the web page is determined to be a frame buster or inaccessible, a notification can be presented to a user to both inform the user of the circumstance and present possible actions. One of those actions could include showing the frame busting web page. Alternatively, the implementer could decide not to show the frame busting web page. For inaccessible or invalid content, the implementer could follow the same strategy as performed for handling frame busting, or the implementer could present alternative content as a substitute for the original content. Correspondingly, messages can be displayed to the user when an attempt to download an image or other media type fails. As such, FIGS. 2-6 illustrate various implementation choices which can be tailored to a situation.

The prior discussion is for illustrative purposes to convey exemplary embodiments. The steps discussed in FIGS. 5 and 6 may be executed without regards to order. Some steps may be omitted and some steps may be executed at a different time than shown. For example, step 550 may be executed before step 540, and step 560 may be executed before step 530. The point here is to convey that the figures are merely exemplary for the embodiments of the present invention and that other embodiments may be implemented. It will be understood that certain features and sub-combinations are of utility and may be employed without reference to other features and sub-combinations and are contemplated within the scope of the claims.

As shown in the above scenarios, the present invention may be implemented in various ways. From the foregoing, it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. One or more computer-readable media containing thereon computer-readable code executed by one or more computers for performing a method for handling third-party content in web applications, comprising:
    operating a set of software to detect third-party content controlled by third party, wherein the third-party content is embedded in a web page, and the third-party content is accessed or executed from embedded content in the web page rendered by a host application;
    detecting the third-party content in the web page;
    downloading the third-party content so that the third-party content is classified;
    analyzing the third-party content with a classifier;
    detecting one or more problems with the third-party content as an output of the classifier, wherein detecting the one or more problems comprises at least one of detecting when one or more variables is set to perform a frame break, identifying one or more software patterns associated with the frame break, and detecting a particular software for the frame break; and wherein the one or more problems include at least one of the third-party content no longer exists, the third-party content is unavailable, the third-party content changes, or the third-party content disrupts the host application; and
    modifying the web page to remove the one or more problems that are detected before rendering the web page.

2. The media of claim 1, wherein operating the set of software comprises gathering the third-party content controlled by the third party associated with the embedded content in the web page.

3. The media of claim 2, wherein the third party comprises an owner or a controller of the third-party content, and the third party is not the owner nor the controller of the web page.

4. The media of claim 3, wherein the third-party content is selected from a group including one or more links, another web page, an image, a video, an audio, a document, a flash application, a data in an really simple syndication (RSS) feed, an extensible markup language (XML) content, and a Javascript application.

5. The media of claim 1, wherein the set of software resides on a server.

6. The media of claim 1, wherein the set of software resides on a client-side computing device.

7. The media of claim 1, wherein detecting the one or more problems comprises analyzing the third-party content to determine if the set of content no longer exists, if the third-party content is unavailable, if the third-party content changes, or if the third-party content disrupts the host application.

8. The media of claim 7, wherein the host application is a web browser.

9. The media of claim 8, wherein upon a detection of the frame break, the web browser is redirected to another web page.

10. The media of claim 1, wherein modifying the web page comprises modifying one or more hypertext markup language (HTML) files to remove the embedded content associated with the third-party content.

11. The media of claim 10, wherein modifying the web page comprises at least one of adding other content to the one or more HTML files wherein the other content is associated with another third-party content, or adding the another third-party content directly to the one or more HTML files.

12. The media of claim 1, wherein modifying the web page comprises changing the third-party content or replacing the set of content.

13. The media of claim 12, wherein modifying the web page comprises changing the web page before it is displayed on a computing device of a user.

14. One or more computer-readable media containing thereon computer-readable code executed by one or more computers for performing a method for handling third-party content in web applications, comprising:
    operating a set of software to detect third-party content controlled by third party, wherein the third-party content is embedded in a web page, and the third-party content is accessed or executed from embedded content in the web page rendered by a host application;
    detecting the third-party content in the web page;
    downloading the third-party content so that the third-party content is classified;
    analyzing the third-party content with a classifier;
    detecting one or more problems with the third-party content as an output of the classifier, wherein detecting the one or more problems comprises at least one of detecting when one or more variables is set to perform a frame break, identifying one or more software patterns associated with the frame break, and detecting a particular software for the frame break; and wherein the one or more problems include at least one of the third-party content no longer exists, the third-party content is unavailable, the third-party content changes, or the third-party content disrupts the host application; and
    providing to a user at least one of a notification about the one or more problems, an option to display the set of content, and an option to display another set of content before rendering the web page.

15. A method for detecting a validity of third-party content in a web application using a set of computer software, comprising:
- periodically, verifying one or more third-party links and one or more third-party content in a web page;
- searching for the one or more third-party links or the one or more third-party content associated with the web page;
- downloading the one or more third-party links or the one or more third-party content so that the one or more third-party links or the one or more third-party content are analyzed;
- analyzing the one or more third-party links or the one or more third-party content to create one or more identifiers for each of the one or more third-party links or the one or more third-party content;
- creating the one or more identifiers for each of the one or more third-party links or the one or more third-party content; and
- detecting a change in a link or a content from a comparison of a last identifier associated with a last analysis of the link or the content to the current identifier associated with a current analysis of the link or the content, wherein detecting the change in the link or the content comprises at least one of detecting when one or more variables is set to perform a frame break, identifying one or more software patterns associated with the frame break, and detecting a particular software for the frame break.

16. The method of claim 15, further comprising modifying the link or the content if the last identifier and the current identifier are different.

17. The method of claim 16, wherein the set of computer software operates on one or more servers.

18. The method of claim 16, wherein the set of computer software operates on the one or more servers to determine the last identifier and a set of computer software operates on a computing device of a user to determine the current identifier.

* * * * *